(No Model.) 3 Sheets—Sheet 2.
J. ROGER.
SWINGING BEARING.
No. 508,981. Patented Nov. 21, 1893.
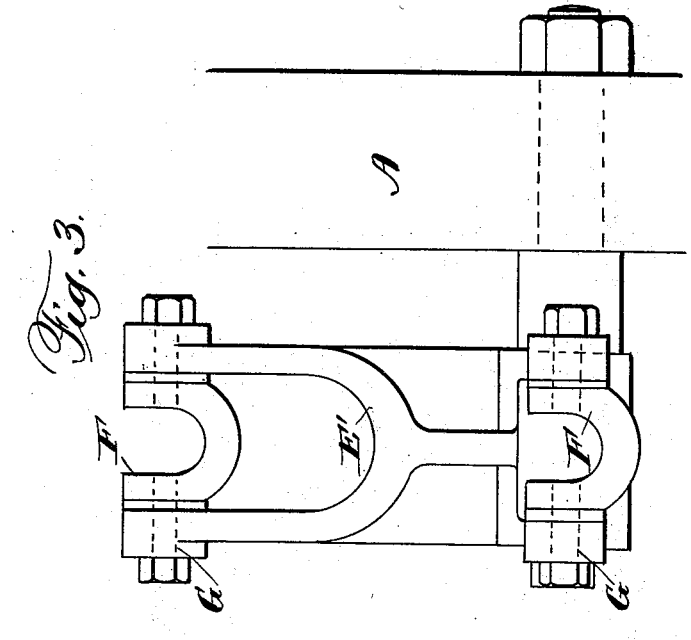
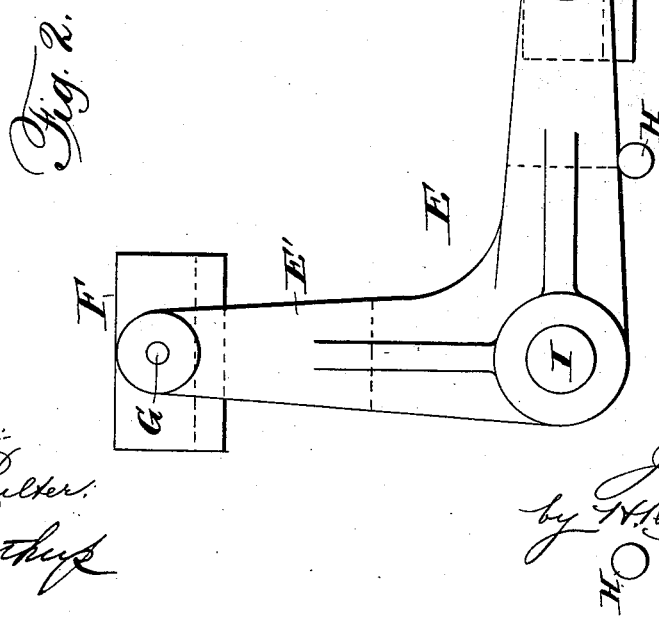
Witnesses:
Wm E Coulter
C. S. Northup
Inventor:
John Roger,
by H. P. Willson
his attorney (No Model.) 3 Sheets—Sheet 3.
J. ROGER.
SWINGING BEARING.
No. 508,981. Patented Nov. 21, 1893.
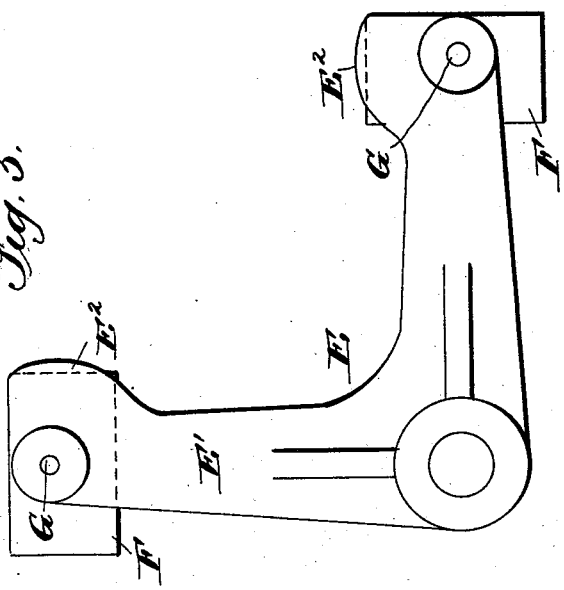
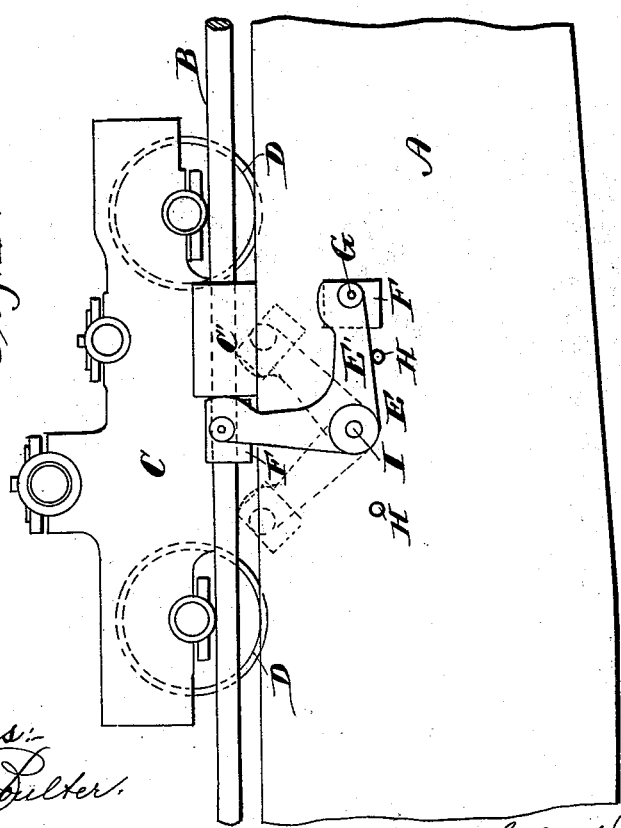
Witnesses:
Inventor:
John Roger,
by his attorney.
THE NATIONAL LITHOGRAPHING COMPANY,
WASHINGTON, D. C.

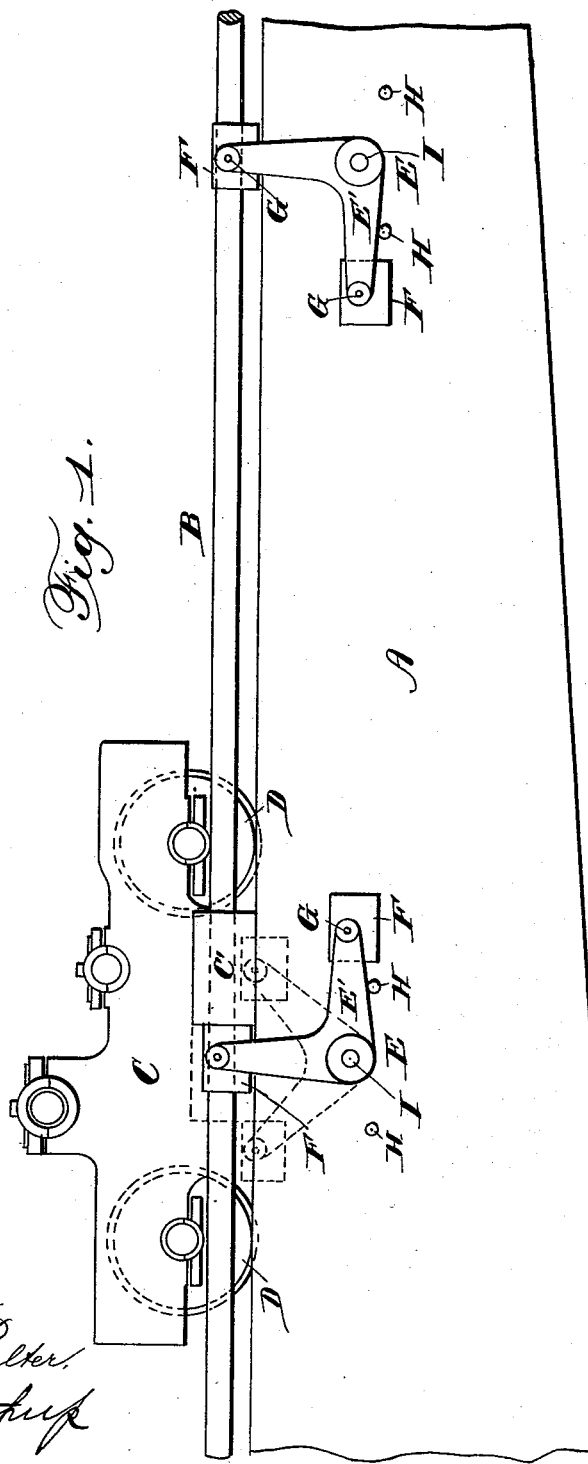

UNITED STATES PATENT OFFICE.

JOHN ROGER, OF DENVER, COLORADO.

SWINGING BEARING.

SPECIFICATION forming part of Letters Patent No. 508,981, dated November 21, 1893.

Application filed May 26, 1893. Serial No. 475,612. (No model.)

*To all whom it may concern:*

Be it known that I, JOHN ROGER, a subject of the Queen of Great Britain, residing at Denver, in the county of Arapahoe and State of Colorado, have invented certain new and useful Improvements in Swinging Bearings; and I do hereby declare the following to be a full, clear, and exact description of the invention, such as will enable others skilled in the art to which it appertains to make and use the same.

My invention has relation to traveling cranes, wherein a trolley or carriage is supported by and adapted to travel upon a girder suitably supported at its ends, and my invention relates more particularly to a swinging or oscillating bearing for the shaft carried by said girder and adapted to communicate the traveling movement to the trolley or carriage, and among the objects in view is to provide a swinging or oscillating bearing or series of such bearings arranged at certain intervals on the girder and longitudinally of the shaft, and adapted to be operated by the trolley or carriage so as to swing out of the way of the same and to again support the shaft immediately after the said trolley or carriage has passed, and with the above and other objects in view, my invention consists in the novel construction, arrangement and combinations of parts, all as hereinafter fully described, illustrated in the drawings, and pointed out in the appended claims.

In the drawings:—Figure 1 is a side elevation of an ordinary girder of a traveling crane and the trolley or carriage supported thereby, and showing also my improved supporting bearings for the shaft. Fig. 2 is an enlarged side elevation of one of the improved bearings and the stops therefor. Fig. 3 is an enlarged end view of the bearing and the girder supporting the same. Fig. 4 is a view similar to Fig. 1, showing a slightly modified form of bearing for the shaft. Fig. 5 is an enlarged detail view of the said modified form of bearing.

Referring to the above described drawings and particularly Figs. 1 to 3, A indicates the usual girder of a traveling crane upon which is supported and adapted to travel the usual trolley or carriage C, which is provided with the wheels D, running upon the upper edge of the girder, as shown. The girder may be supported at its ends in any suitable or desired manner and by any desired means, and arranged longitudinally of and slightly above the upper edge of said girder and to one side of the latter is a shaft B, which is adapted to impart a traveling movement back and forth to the trolley or carriage C by any suitable or desired mechanism, which latter I have deemed unnecessary to show or describe in detail herein, since it forms no part of my present invention. The carriage C is provided at one side with a fixed box C' which has a bearing upon the shaft B which passes through said box.

E indicates my improved bearing for the shaft B, and in practice I arrange a series of said bearings at certain points along the girder longitudinally of the shaft, whereby to provide a firm support for the latter throughout its length. The bearing E comprises a bell-crank lever E' pivoted upon a stud or short shaft I, carried by and projecting laterally from the girder, and in the outer end of each of the arms of the lever E' is pivotally mounted upon pivot bolts or studs G a box or bearing F, the pivotal point of each of said boxes or bearings F being so located that the same will always occupy a horizontal position as shown in Figs. 1 and 2.

The particular form of the box F may be varied but I preferably construct the same in the form shown, wherein it has a somewhat semi-cylindrical or U-shape and by reason of said shape and the manner of pivoting the boxes the same will be adapted to lie under and support the shaft B when the levers are in either of the positions shown in full lines in Fig. 1, and when in said positions are adapted to be struck by the box C' of the carriage and swung or oscillated into the position shown in dotted lines in said Fig. 1.

In operation, when the carriage C is caused to travel along the girder, say toward the left in Fig. 1, the box C' comes in contact with the box F of the now vertical arm of the lever E', and causes said lever to tilt or swing into the position shown in dotted lines, until the said box E clears the box C' whereby the carriage is permitted to pass and act in a similar manner upon the other levers E' which it will meet in its movement along the shaft. It will be seen that when a lever has been tilted by the carriage, the box carried by the other arm of said lever will be brought into a position beneath the shaft to support the same, the lever as soon as it passes its center of gravity swinging to the left until it assumes the position represented by the lever on the right of Fig. 1, the box F of the arm which was formerly in a horizontal position now lying against and firmly supporting the shaft. When the carriage is traveling back, that is to say to the right in Fig. 1, each of the levers E' will be acted upon by the same and caused to swing in a reverse direction, i. e., to the right, and in the manner just described hereinabove, so that the shaft will always be supported firmly throughout its length when the carriage is traveling in either direction upon the girder.

In order to prevent the levers E' from swinging too far in either direction, and maintain them in the proper positions for the support of the shaft, I provide stop pins H projecting laterally from the girder upon either side of the stud I and in a position to be struck by the arms of the lever and limit its swinging movement.

In Figs. 4 and 5 I show a slightly modified form of the swinging bearing, wherein each arm of the lever E' is provided at one side and at the end with an enlargement or projection $E^2$, which projects slightly beyond the end of the box F in a position to be struck by the box C' of the carriage C, when the latter is traveling in either direction, for which purpose the projections are located upon the adjacent sides of the levers, as shown in Fig. 5. By this construction, the boxes F will not be struck by the box C' of the carriage, which box will act upon the projections $E^2$ instead; the principle of operation of this form of my bearing however remains the same as that described with reference to the other construction thereof, and the same results are obtained. By the provision of the projections $E^2$ on the levers there will be less liability of dirt being retained which might tend to render the device inoperative.

The swinging boxes F in the modified form of my invention, may, if desired, be permitted to have only a very slight swinging movement, so as to assume a horizontal position when supporting the shaft, and a substantially vertical position when not supporting the same, as shown in Fig. 5.

I would state that the manner of arranging the boxes F in the outer ends of the lever arms, that is to say, pivoting said boxes in said arms so that they will normally occupy a horizontal position during the swinging movements of the lever constitutes a most important feature of my invention, as thereby I attain advantages which could not be attained were the boxes rigidly secured to or integrally formed with the lever arms. By pivoting my boxes F in the manner described, the same may be made of considerable length and yet operate to come into the proper position beneath the shaft and to be moved from beneath the same when the lever is tilted as readily as a short box. Thus a long bearing or support will be given to the shaft. Furthermore, by reason of the boxes being pivoted and occupying a normally horizontal position, the same will readily swing up beneath the shaft and no corner or edge will be liable to come in contact with the shaft either when the box is being raised up to support the shaft or when being turned down to clear the same. Further than this, the boxes when in place beneath the shaft will readily adjust themselves thereto and cause the shaft to bear equally on the boxes. Were the boxes rigidly secured to or to form an integral part of the lever arms it would be impossible to employ long boxes for the reason that the corners thereof would in practice come in contact with the shaft and prevent either the proper swinging movement of the levers, or produce in a short time extreme wear of said boxes.

From the foregoing description when taken in connection with the accompanying drawings, the advantages of my invention will be readily understood and appreciated.

What I claim, and desire to secure by Letters Patent, is—

1. The herein described swinging bearing consisting of a pivoted bell-crank lever, and a semi-cylindrical or U-shape box pivoted in the outer end of each of the arms of said lever and adapted to normally occupy a horizontal position during the swinging movements of the lever as and for the purpose specified.

2. The combination with a support, a carriage adapted to travel thereon, and provided with a box, and a shaft passing through the latter, of a swinging bearing consisting of a bell-crank lever pivoted upon the support, and a box pivoted in the outer end of each arm of said lever, and adapted to support the shaft, and also adapted to normally occupy a horizontal position during the swinging movements of the lever said lever being adapted to be tilted when the carriage moves upon the support, in the manner and for the purpose specified.

3. The combination with a support, a carriage adapted to travel thereon, and provided with a box, and a shaft passing through the latter, of a swinging bearing consisting of a bell-crank lever pivoted upon the support, a semi-cylindrical or U-shape box pivoted in the outer end of each arm of said lever, and adapted to support the shaft and to be struck by the box on the carriage to cause the lever to be tilted and also adapted to normally occupy a horizontal position during the swinging movements of the lever in the manner and for the purpose specified.

4. The combination with a support, a carriage adapted to travel thereon and provided with a box, and a shaft passing through the latter, of a swinging bearing consisting of a bell-crank lever pivoted upon the support, and provided at the ends with projections, as described, a box pivoted in the arms of the lever, and adapted to support the shaft, and also adapted to normally occupy a horizontal position during the swinging movements of the lever the projections on the lever being adapted to be struck by the box on the carriage to cause the lever to be tilted, as and for the purpose specified.

In testimony whereof I affix my signature in presence of two witnesses.

JOHN ROGER.

Witnesses:
MARY A. WHEELER,
J. M. CALLOW.